United States Patent
Lin et al.

(10) Patent No.: US 7,751,679 B1
(45) Date of Patent: Jul. 6, 2010

(54) BRIGHTNESS ENHANCEMENT FILM AND BACKLIGHT MODULE

(75) Inventors: Chi-Feng Lin, Taipei (TW); Yi-Fan Chen, Tainan Hsien (TW)

(73) Assignees: Univacco Technology Inc., Tainan Hsien (TW); National Applied Research Laboratories, Taipei (TW)

( * ) Notice: Subject to any disclaimer, the term of this patent is extended or adjusted under 35 U.S.C. 154(b) by 0 days.

(21) Appl. No.: 12/314,533

(22) Filed: Dec. 12, 2008

(51) Int. Cl.
*G02B 6/10* (2006.01)
*F21V 7/04* (2006.01)

(52) U.S. Cl. .................. 385/146; 385/901; 362/622; 362/624; 362/627

(58) Field of Classification Search .............. 385/146, 385/147, 901; 362/31, 620–627; 359/599, 359/707, 831–837
See application file for complete search history.

(56) References Cited

U.S. PATENT DOCUMENTS

| | | | |
|---|---|---|---|
| 5,771,328 A | * | 6/1998 | Wortman et al. ............ 385/146 |
| 6,576,887 B2 | * | 6/2003 | Whitney et al. ........ 250/227.11 |
| 7,052,168 B2 | * | 5/2006 | Epstein et al. .............. 362/625 |
| 7,221,847 B2 | * | 5/2007 | Gardiner et al. ............. 385/146 |
| 7,397,605 B2 | * | 7/2008 | Mai ........................... 359/599 |
| 7,431,493 B2 | * | 10/2008 | Lee ............................ 362/626 |
| 7,618,164 B2 | * | 11/2009 | Wang et al. ................. 362/339 |

FOREIGN PATENT DOCUMENTS

JP 2003109416 A * 4/2003

* cited by examiner

*Primary Examiner*—Daniel Petkovsek
(74) *Attorney, Agent, or Firm*—Rosenberg, Klein & Lee (57) ABSTRACT

The present invention relates to a brightness enhancement film and a backlight module having the brightness enhancement film. The brightness enhancement film includes first micro-reflectors and second micro-reflectors. The cross-section of each of the first and second micro-reflectors is a triangle having two same or different base angles and a wavy crest line. The widths of the first and second micro-reflectors vary along with the valleys and peaks to broaden or to narrow with respect to two sides thereof such that the neighboring lines between the first and second micro-reflectors are wavy. The backlight module is coupled with the brightness enhancement film. This enhances brightness, illuminates evenly, and avoids a moire effect.

14 Claims, 9 Drawing Sheets

BRIGHTNESS ENHANCEMENT FILM AND BACKLIGHT MODULE

BACKGROUND OF THE INVENTION

1. Field of the Invention

The present invention relates to a brightness enhancement film and a backlight module having the brightness enhancement film, and more particularly to a brightness enhancement film having first and second micro-reflectors in different average heights and widths and wavy crest lines. The widths of the first and second micro-reflectors vary along with valleys and peaks thereof. The neighboring lines between the first and second micro-reflectors are wavy. This enhances brightness, illuminates evenly, and avoids a moire effect.

2. Description of the Prior Art

Figure 9:
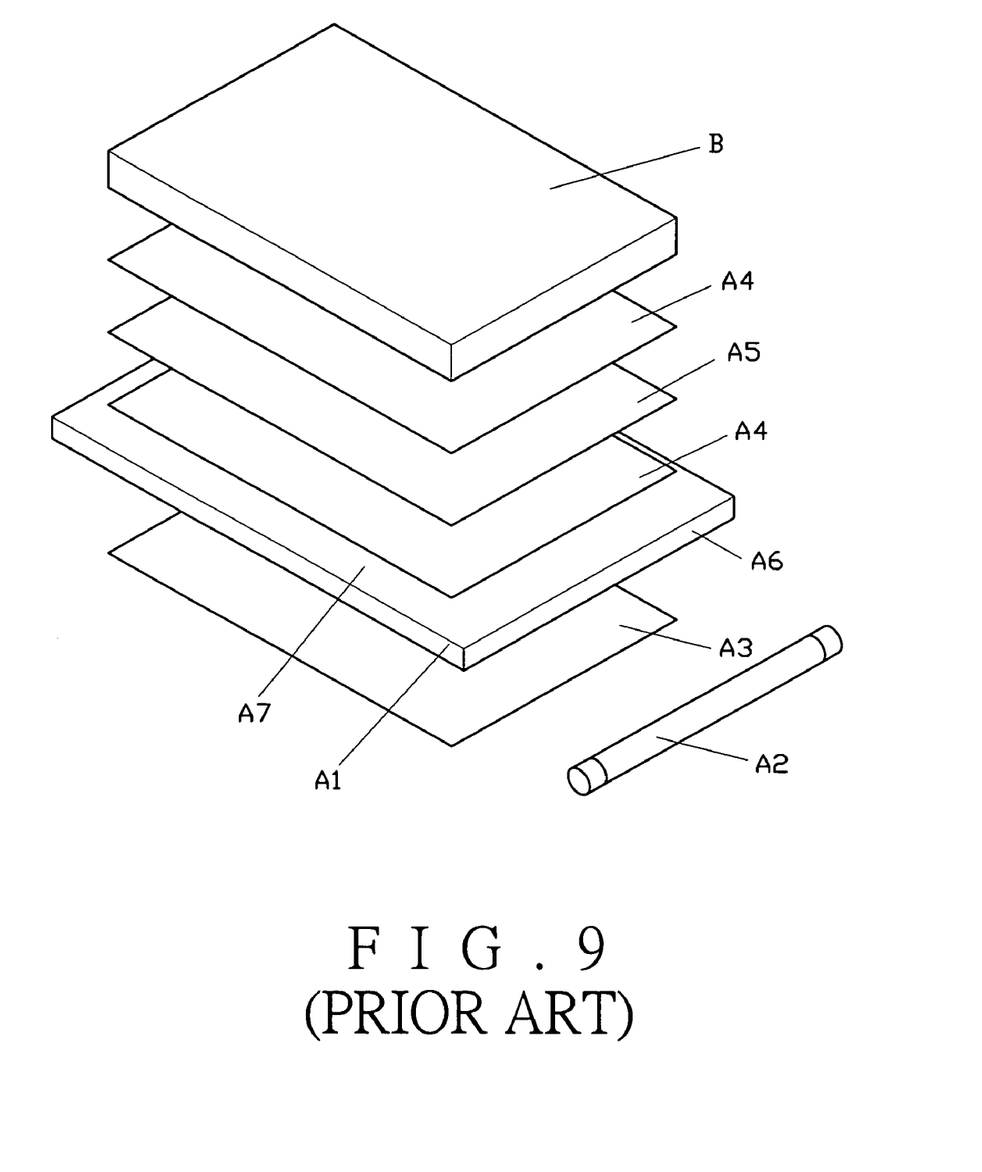
FIG. 9 is an exploded view of the prior art.

A backlight module A of a conventional LCD display, as shown in FIG. 9, comprises a light guide plate A1, a light source A2, a reflector A3, a diffusion film A4, and a brightness enhancement film A5. The light source A2 is disposed at one side of the light guide plate A1 to provide light from a ray entering side A6 to the light guide plate A1 to reflect therein and emit from a ray displaying side A7. The light will then emits through the diffusion film A4 and the brightness enhancement film A5 and reaches to a LCD panel B. The brightness enhancement film A5 can accumulate the light to increase the light as well as to illuminate evenly.

In order to accumulate illumination for a brightness enhancement film to increase the brightness and to illuminate evenly, the surface of the film comprises a number of prisms. As taught in U.S. Pat. No. 5,917,664, a brightness enhancement film has a plurality of linear prisms. The prisms are disposed in pairs, each pair having first and second prisms and each prism has a prism angle and a valley angle. Either the prism angles or the valley angles, but not both, are equal. However, it does not have the function of accumulating light.

Taiwanese Patent No. 1274896 disclosed "an enhancing structure for a light accumulating device", which comprises a light accumulating device on a baseboard. The light accumulating device has at least a wavy extension surface to enhance light accumulating efficiency. However, this design can not diffuse the light evenly on the display.

Taiwanese Patent No. 1278662 disclosed "an optical film structure", which comprises micro-prisms formed on an optical film. Each micro-prism has at least two peaks in different heights, preventing the ray from producing interference strips. However, it downgrades the accumulation of light.

SUMMARY OF THE INVENTION

According to a first aspect of the present invention, there is provided a brightness enhancement film comprising a pair of first sides corresponding to each other, a pair of second sides corresponding to each other, and a number of first micro-reflectors and second micro-reflectors disposed side by side, said first micro-reflectors having a first average height and a first average width, said second micro-reflectors having a second average height and a second average width, said first average height and said first average width being different from said second average height and said second average width, each of said first micro-reflectors and said second micro-reflectors having a cross-section which is a triangle viewed from the first side, said triangle having an apex and a base, said apex of said triangle forming a crest line viewed from the second side, two sides of said crest line being connecting points of said triangle, said connecting points forming neighboring lines of said first micro-reflector and second micro-reflector, said crest line being wavy having continuous valleys and peaks, the widths of said first micro-reflectors and said second micro-reflectors varying along with said valleys and said peaks, said neighboring lines between said first micro-reflectors and said second micro-reflectors being wavy.

Preferably, the valley of each said first micro-reflector has an equal height with respect to the peak of each said second micro-reflector.

Preferably, the valley of each said first micro-reflector has a different height with respect to the peak of each said second micro-reflector.

Preferably, each of said first micro-reflectors and said second micro-reflectors has a triangular cross-section having two same base angles.

Preferably, each of said first micro-reflectors and said second micro-reflectors has a triangular cross-section having two different base angles.

Preferably, said first and second average heights of said first micro-reflectors and said second micro-reflectors are average values of the perpendicular heights of said first micro-reflectors and said second micro-reflectors.

Preferably, said first and second average widths of said first micro-reflectors and said second micro-reflectors are average values of the width taken from a bottom of the cross-section of each of said first micro-reflectors and said second micro-reflectors.

According to a second aspect of the present invention, there is provided a backlight module, comprising at least a light source; a light guide plate having at least one ray entering side and a ray displaying side, said ray entering side being adapted to receive ray from said light source and said ray displaying side being adapted to guide the ray outward; and a brightness enhancement film disposed on said ray displaying side of said light guide plate, said brightness enhancement film comprising a pair of first sides corresponding to each other, a pair of second sides corresponding to each other, and a number of first micro-reflectors and second micro-reflectors disposed side by side, said first micro-reflectors having a first average height and a first average width, said second micro-reflectors having a second average height and a second average width, said first average height and said first average width being different from said second average height and said second average width, each of said first micro-reflectors and said second micro-reflectors having a cross-section which is a triangle viewed from the first side, said triangle having an apex and a base, said apex of said triangle forming a crest line viewed from the second side, two sides of said crest line forming connecting points of said triangle, said connecting points being neighboring lines of said first micro-reflectors and said second micro-reflectors, said crest line being wavy having continuous valleys and peaks, the widths of said first micro-reflectors and said second micro-reflectors varying along with said valleys and said peaks, said neighboring lines between said first micro-reflectors and said second micro-reflectors being wavy.

Preferably, the valley of each said first micro-reflector has an equal height with respect to the peak of each said second micro-reflector Preferably, the valley of each said first micro-reflector has a different height with respect to the peak of each said second micro-reflector.

Preferably, each of said first micro-reflectors and said second micro-reflectors has a triangular cross-section having two same base angles.

Preferably, each of said first micro-reflectors and said second micro-reflectors has a triangular cross-section having two different base angles.

Preferably, said first and second average heights of said first micro-reflectors and said second micro-reflectors are average values of the perpendicular heights of said first micro-reflectors and said second micro-reflectors.

Preferably, said first and second average widths of said first micro-reflectors and said second micro-reflectors are average values of the width taken from a bottom of the cross-section of each of said first micro-reflectors and said second micro-reflectors.

The present invention has the following advantages:
1. The first and second micro-reflectors having different heights and widths are disposed side by side on the brightness enhancement film in a wavy shape, providing better brightness and illuminating evenly.
2. The first and second micro-reflectors have peaks and valleys to hold against the diffusion film, preventing the brightness enhancement film from distortion or damage.
3. The valleys of the first and second micro-reflectors enable to collect light ray for better brightness, avoiding a moire effect.

DETAILED DESCRIPTION OF THE REFERRED EMBODIMENTS

Figure 1:
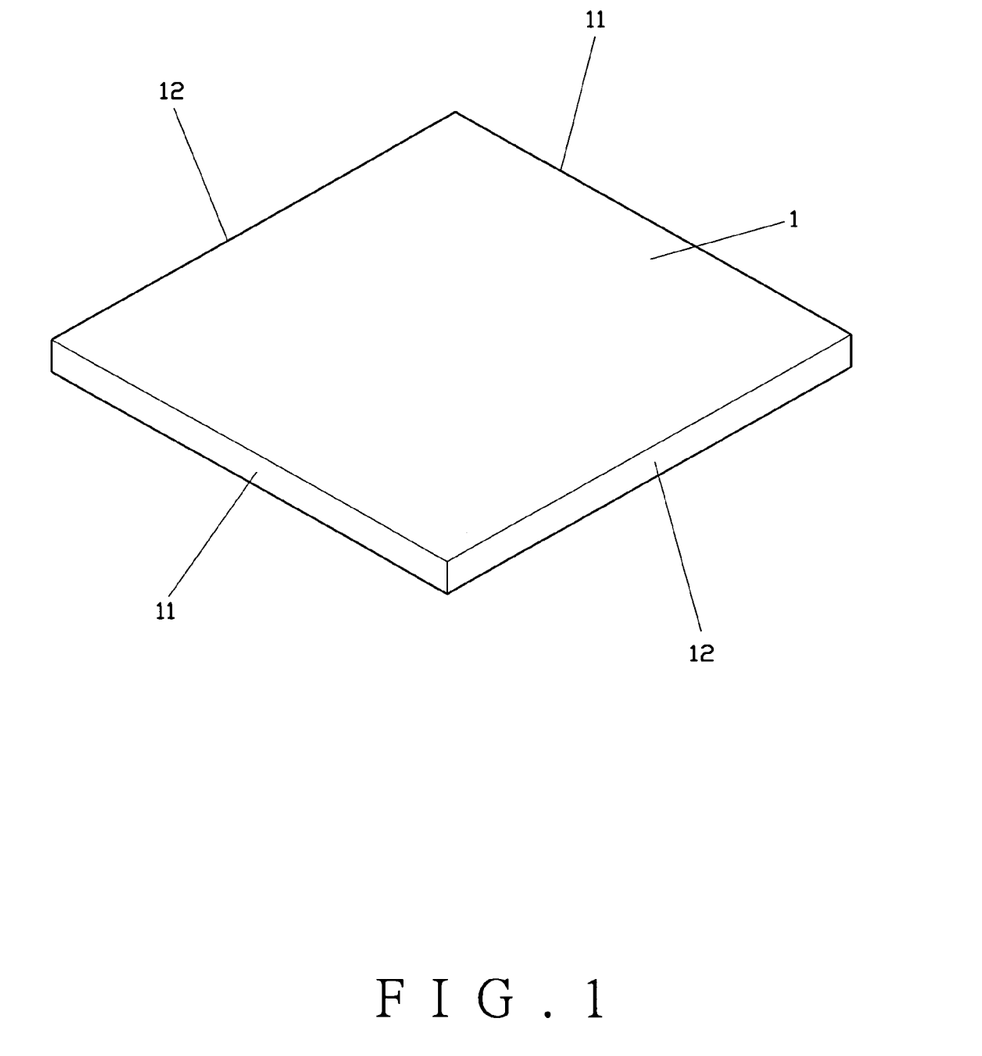
FIG. 1 is a perspective view of a brightness enhancement film of the present invention.
Figure 2:
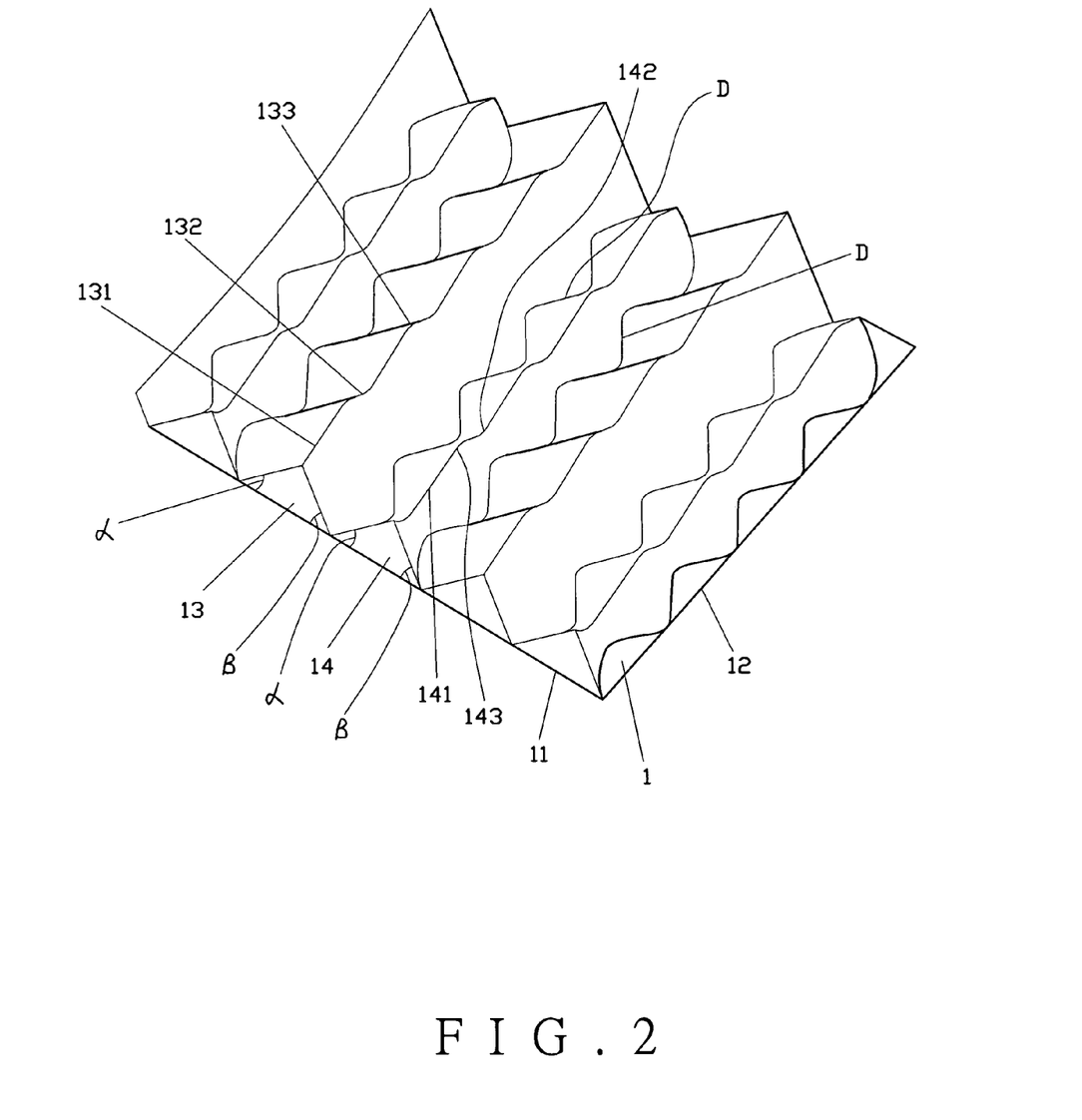
FIG. 2 is an enlarged sectional view of FIG. 1.
Figure 3:
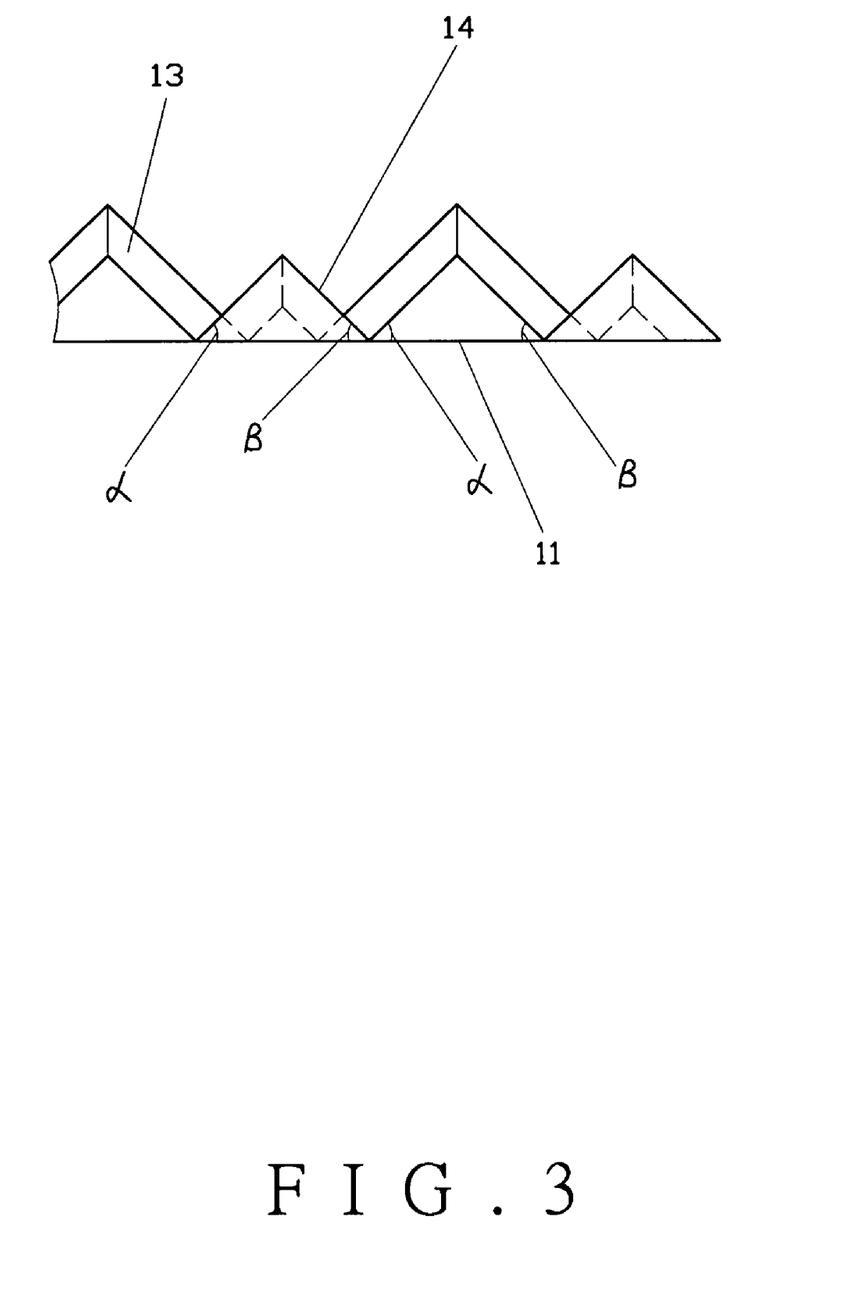
FIG. 3 is a cross-sectional view of FIG. 1 showing first micro-reflectors and second micro-reflectors.
Figure 4:
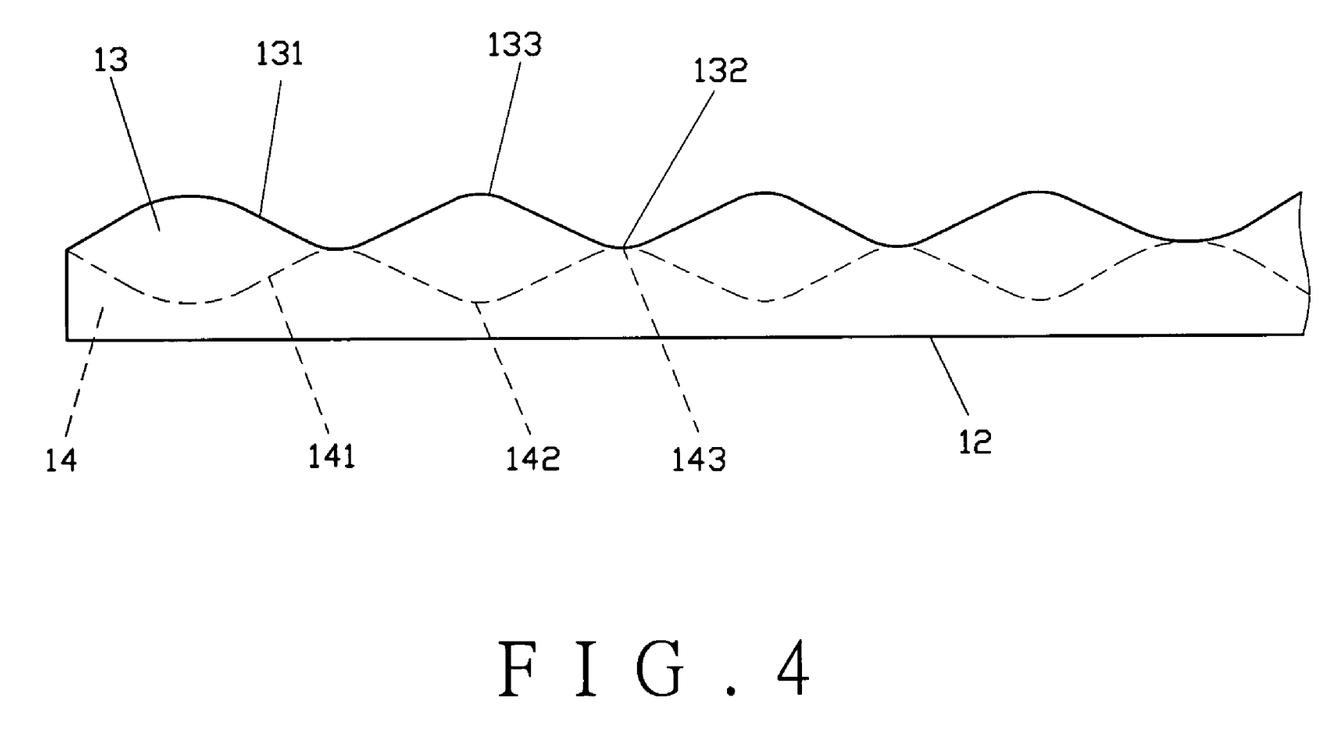
FIG. 4 is a schematic view showing the variation of the heights of the first micro-reflectors and the second micro-reflectors.
Figure 5:
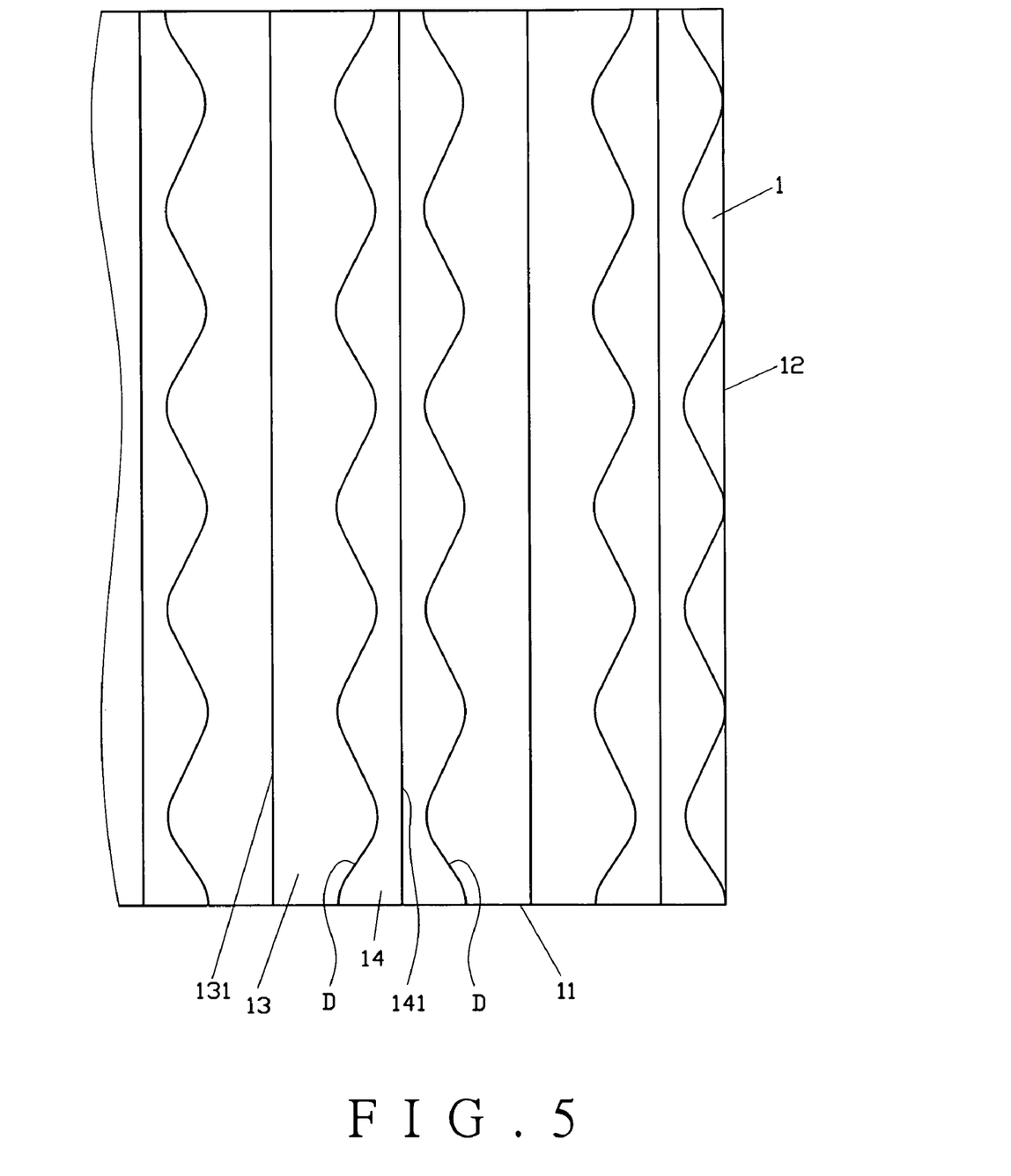
FIG. 5 is a schematic view showing the variation of the widths of the first micro-reflectors and the second micro-reflectors.

As shown in FIGS. 1 and 2, a brightness enhancement film 1 of the present invention comprises a pair of first sides 11 corresponding to each other, a pair of second sides corresponding to each other, and a number of first micro-reflectors 13 and second micro-reflectors 14 disposed side by side. Each of the first micro-reflectors 13 has a crest line 131, and each of the second micro-reflectors 14 has a crest line 141. The first micro-reflectors 13 have first average height and width which are different from second average height and width of the second micro-reflectors 14. The first average height of the first micro-reflectors 13 means the average value of the perpendicular heights of the micro-reflectors 13. The second average height of the second micro-reflectors 14 means the average value of the perpendicular heights of the second micro-reflectors 14. The first average width of the first micro-reflectors 13 means the average value of the width taken from the cross-section at the bottom of each of the first micro-reflectors 13. The second average width of the second micro-reflectors 14 means the average value of the width taken from the cross-section at the bottom of each of the second micro-reflectors 14. If the view is taken from the first side 11 of the brightness enhancement film 1, the cross-sections of the first micro-reflectors 13 and the second micro-reflectors 14 are in triangular shapes, as shown in FIG. 3. Each of the first micro-reflectors 13 and the second micro-reflectors 14 has two base angles α and β which are same. If the view is taken from the second side 12, the crest lines 131 and 141 of the first micro-reflector 13 and the second micro-reflector 14 are wavy, as shown in FIG. 4. The first micro-reflector 13 has a peak 133 and a valley 132, and the second micro-reflector 14 has a peak 143 and a valley 142. The valley 132 of the first micro-reflector 13 has an equal height with respect to the peak 143 of the second micro-reflector 14. The widths of the first micro-reflector 13 and the second micro-reflector 14 vary along with the valleys 132 and 142, and along with the peaks 133 and 143 to broaden or to narrow with respect to two sides thereof, as shown in FIG. 5. This forms a neighboring line D between the first micro-reflector 13 and the second micro-reflector 14 in a wave shape.

Figure 6:
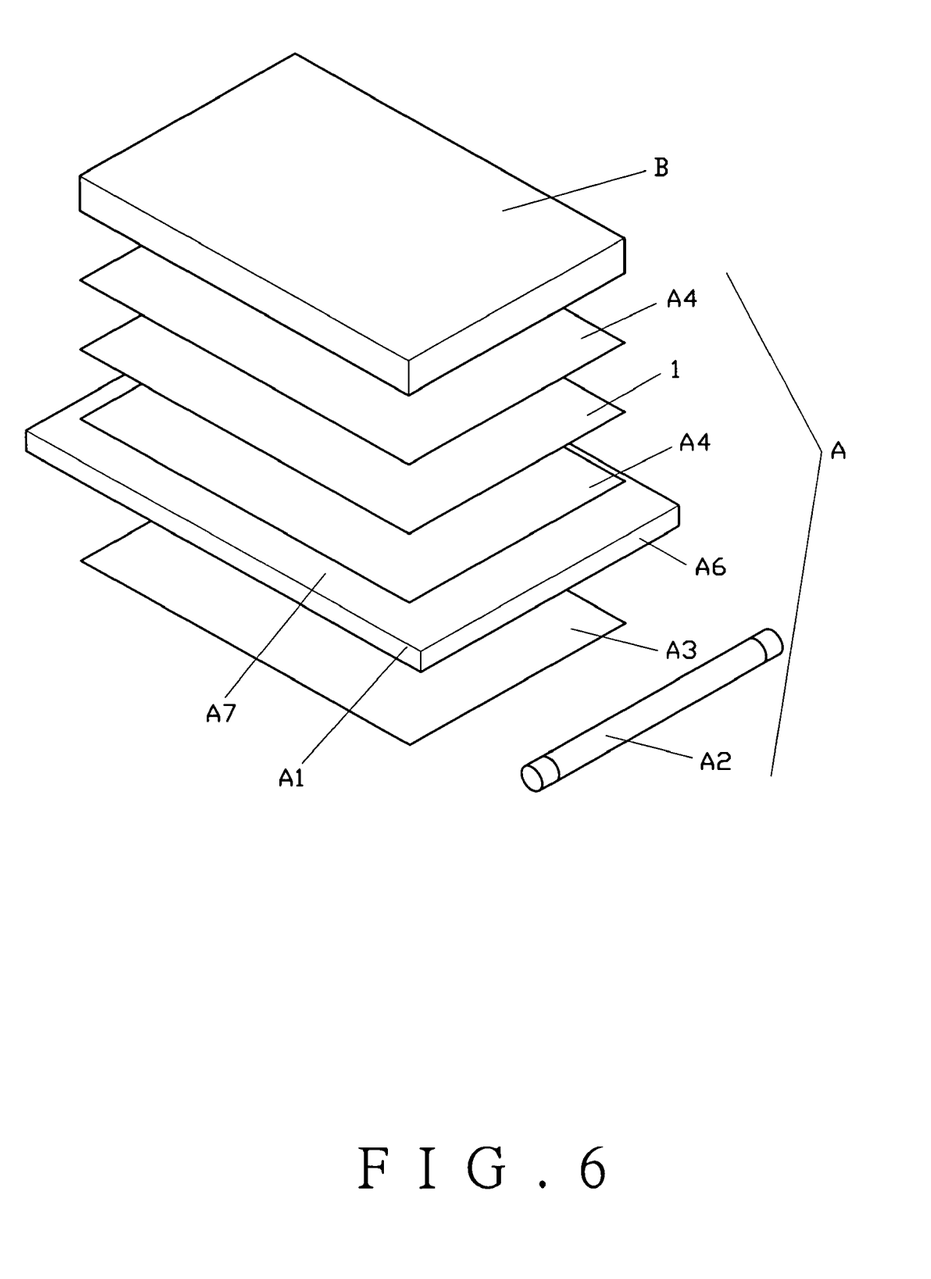
FIG. 6 is an exploded view of a backlight module incorporated with the brightness enhancement film of the present invention.

As shown in FIG. 6, the brightness enhancement film 1 of the present invention is coupled with a light guide plate A1, a light source A2, a reflector A3, and a diffusion film A4 to form a backlight module of a LCD display. The light resource A2 is disposed at one side of the light guide plate A1 to provide light ray emitting into the light guide plate A1 from a ray entering side A6. The fully reflection of the ray in the light guide plate A1 will be transferred therein, thus the reflecting ray emits from a ray displaying side A7 through the diffusion film A4, the peaks 133 and 143 of the first micro-reflectors 13 and the second of the micro-reflectors 14 of the brightness enhancing film 1, and out from a LCD panel B.

Another example is that the valley 132 of the first micro-reflector 13 may have a different height with respect to the peak 143 of the second micro-reflector 14, which also provides the same effect.

Figure 7:
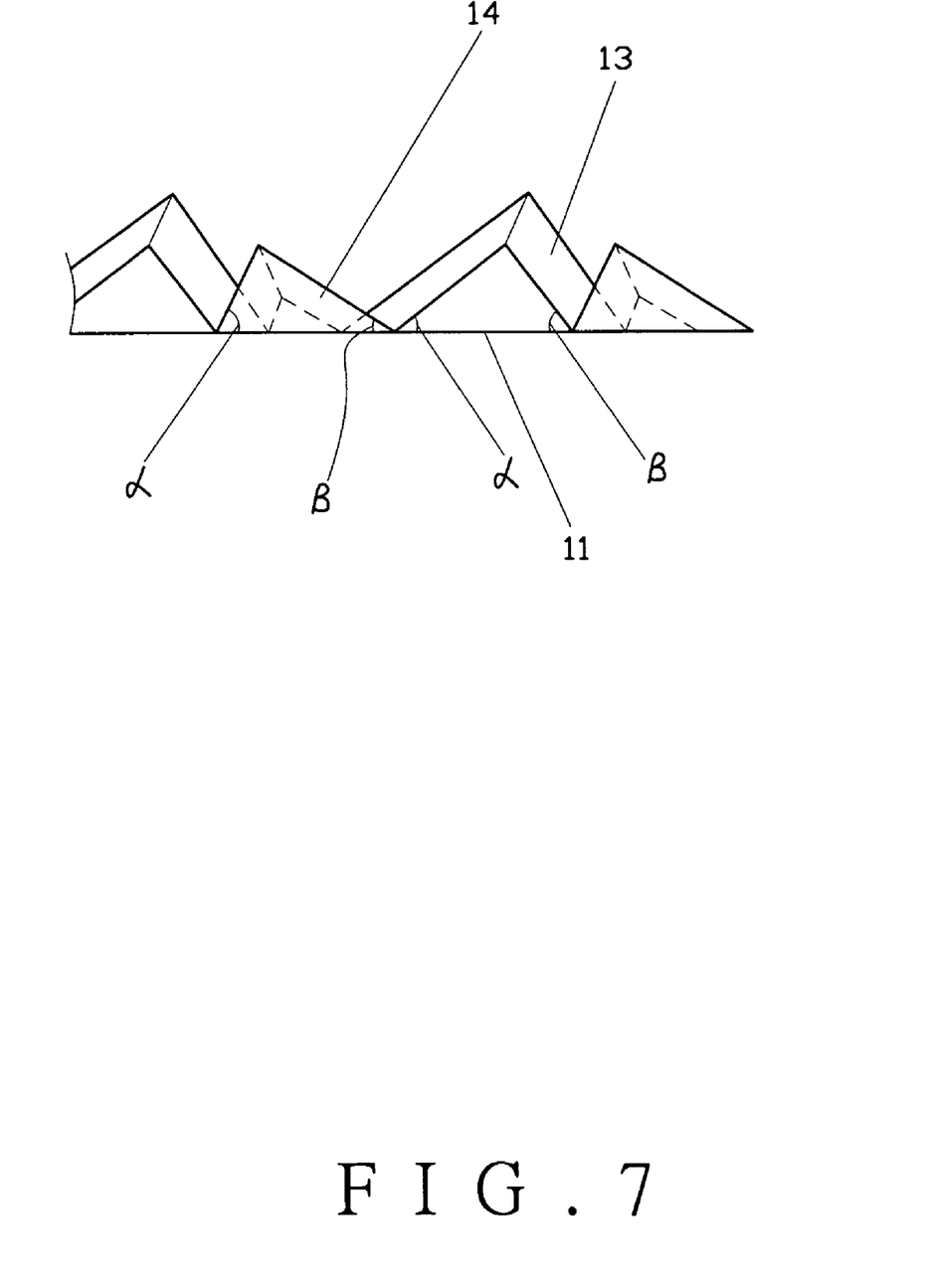
FIG. 7 is a cross-sectional view of the present invention showing the first micro-reflectors and the second micro-reflectors with two different base angles.

Another embodiment of the present invention, as shown in FIG. 7, is substantially similar to the aforesaid embodiment with the exceptions described hereinafter. The cross-section of each of the first micro-reflectors 13 and the second micro-reflectors 14 of the brightness enhancing film 1 is triangle having two different base angles α and β, which also provides the same effect.

Figure 8:
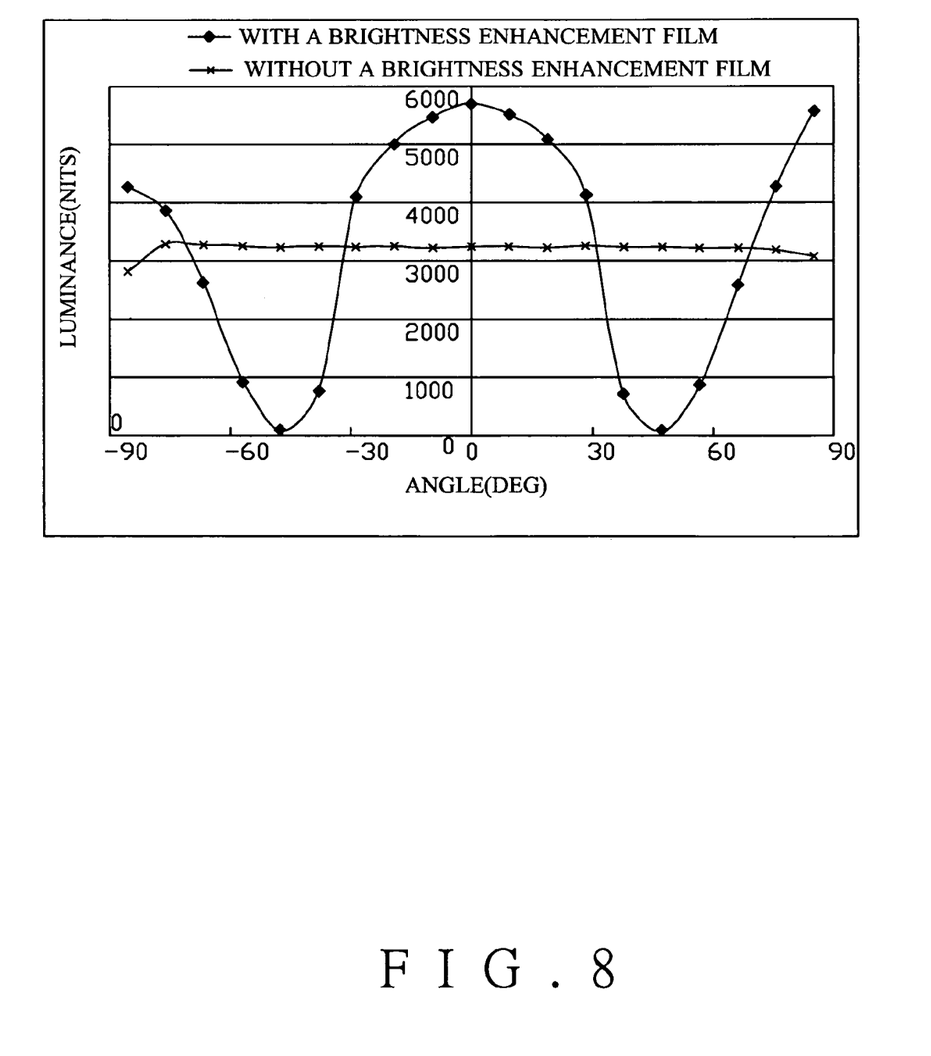
FIG. 8 is a luminosity plot of a backlight module with or without the brightness enhancement film.

FIG. 8 is luminosity plot of a backlight module, luminance 3240 nits without the brightness enhancement film 1 and luminance 5694 nits with the brightness enhancement film 1. The gain has an average of 1.76 times.

What is claimed is:
1. A brightness enhancement film, comprising:
a pair of first sides corresponding to each other, a pair of second sides corresponding to each other, and a plurality of first micro-reflectors and second micro-reflectors disposed side by side;
said first micro-reflectors having a first average height and a first average width, said second micro-reflectors having a second average height and a second average width, said first average height and said first average width being different from said second average height and said second average width,
each of said first micro-reflectors and said second micro-reflectors having a triangular cross-section viewed from the first side, said triangular cross-section having an apex and a base, said apex of said triangular cross-section defining a crest line extending longitudinally from the first side, neighboring lines being disposed between crest lines to delineate adjacent ones of said first micro-reflectors and said second micro-reflectors, said crest lines of said first and second micro-reflectors each defining a straight horizontal profile and a wavy vertical profile having continuous valleys and peaks, said first micro-reflectors being longitudinally offset in vertical profile from said second micro-reflectors, the widths of said first micro-reflectors and said second micro-reflectors varying along with said valleys and said peaks, said neighboring lines between said first micro-reflectors and said second micro-reflectors being wavy.

2. The brightness enhancement film, as claimed in claim 1, wherein the valley of each said first micro-reflector has an equal height with respect to the peak of each said second micro-reflector.

3. The brightness enhancement film, as claimed in claim 1, wherein the valley of each said first micro-reflector has a different height with respect to the peak of each said second micro-reflector.

4. The brightness enhancement film, as claimed in claim 1, wherein each of said first micro-reflectors and said second micro-reflectors has a triangular cross-section having two same base angles.

5. The brightness enhancement film, as claimed in claim 1, wherein each of said first micro-reflectors and said second micro-reflectors has a triangular cross-section having two different base angles.

6. The brightness enhancement film, as claimed in claim 1, wherein said first and second average heights of said first micro-reflectors and said second micro-reflectors are average values of the perpendicular heights of said first micro-reflectors and said second micro-reflectors.

7. The brightness enhancement film, as claimed in claim 1, wherein said first and second average widths of said first micro-reflectors and said second micro-reflectors are average values of the width taken from a bottom of the cross-section of each of said first micro-reflectors and said second micro-reflectors.

8. A backlight module, comprising:
   at least one light source;
   a light guide plate having at least a ray entering side and a ray displaying side, said ray entering side being adapted to receive ray from said light source and said ray displaying side being adapted to guide the ray outward; and
   a brightness enhancement film disposed on said ray displaying side of said light guide plate, said brightness enhancement film comprising:
      a pair of first sides corresponding to each other, a pair of second sides corresponding to each other, and a plurality of first micro-reflectors and second micro-reflectors disposed side by side, said first micro-reflectors having a first average height and a first average width, said second micro-reflectors having a second average height and a second average width, said first average height and said first average width being different from said second average height and said second average width,
      each of said first micro-reflectors and said second micro-reflectors having a triangular cross-section viewed from the first side, said triangular cross-section having an apex and a base, said apex of said triangular cross-section defining a crest line extending longitudinally from the first side,
   neighboring lines being disposed between crest lines to delineate adjacent ones of said first micro-reflectors and said second micro-reflectors, said crest lines of said first and second micro-reflectors each defining a straight horizontal profile and a wavy vertical profile having continuous valleys and peaks, said first micro-reflectors being longitudinally offset in vertical profile from said second micro-reflectors, the widths of said first micro-reflectors and said second micro-reflectors varying along with said valleys and said peaks, said neighboring lines between said first micro-reflectors and said second micro-reflectors being wavy.

9. The backlight module, as claimed in claim 8, wherein the valley of each said first micro-reflector has an equal height with respect to the peak of each said second micro-reflector.

10. The backlight module, as claimed in claim 8, wherein the valley of each said first micro-reflector has a different height with respect to the peak of each said second micro-reflector.

11. The backlight module, as claimed in claim 8, wherein each of said first micro-reflectors and said second micro-reflectors has a triangular cross-section having two same base angles.

12. The backlight module, as claimed in claim 8, wherein each of said first micro-reflectors and said second micro-reflectors has a triangular cross-section having two different base angles.

13. The backlight module, as claimed in claim 8, wherein said first and second average heights of said first micro-reflectors and said second micro-reflectors are average values of the perpendicular heights of said first micro-reflectors and said second micro-reflectors.

14. The backlight module, as claimed in claim 8, wherein said first and second average widths of said first micro-reflectors and said second micro-reflectors are average values of the width taken from a bottom of the cross-section of each of said first micro-reflectors and said second micro-reflectors.

\* \* \* \* \*